Figure 1:
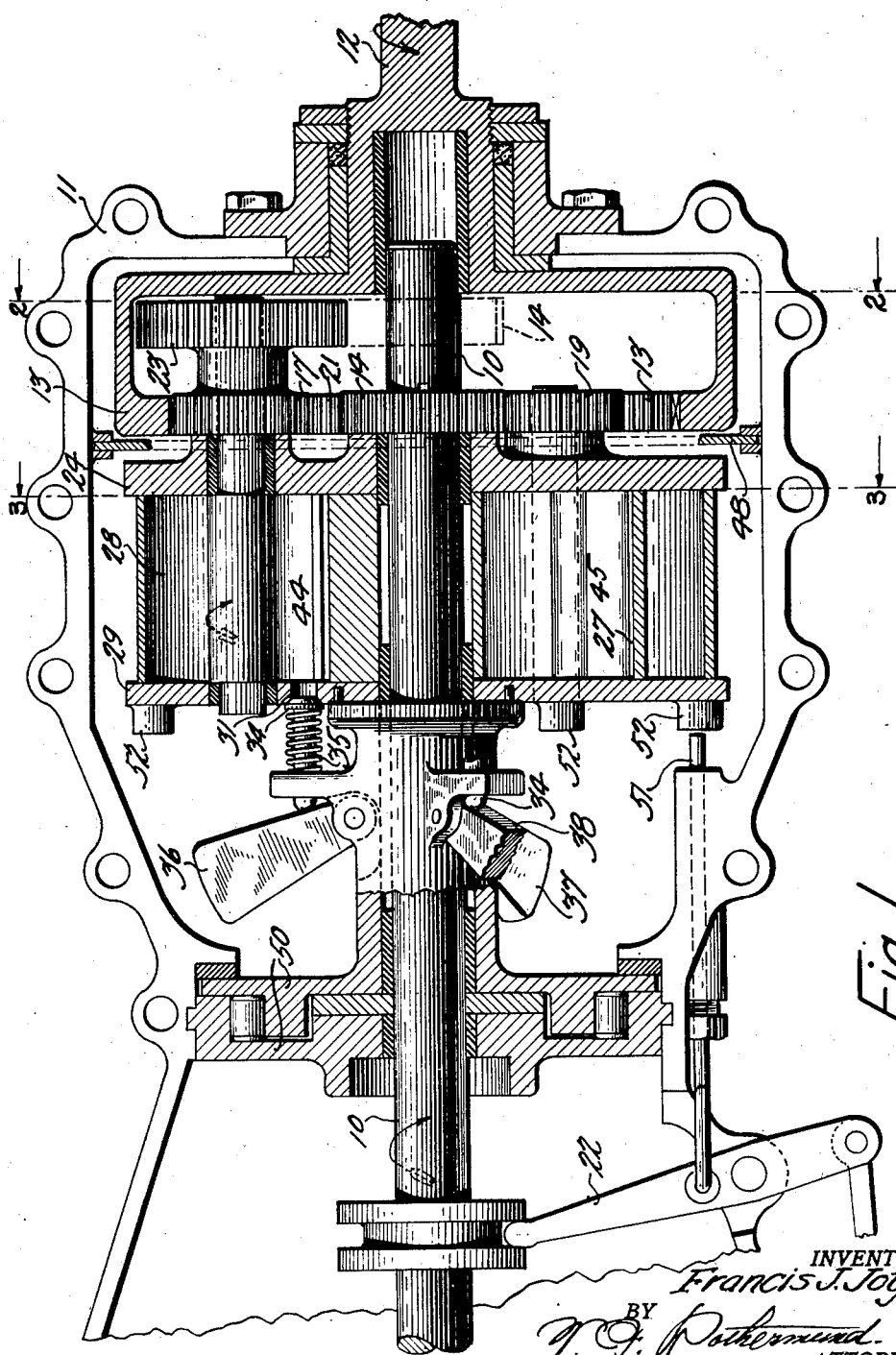

May 11, 1937.     F. J. JOYCE     2,079,691
TRANSMISSION
Filed Oct. 26, 1934     4 Sheets-Sheet 1

INVENTOR
Francis J. Joyce
BY
ATTORNEY

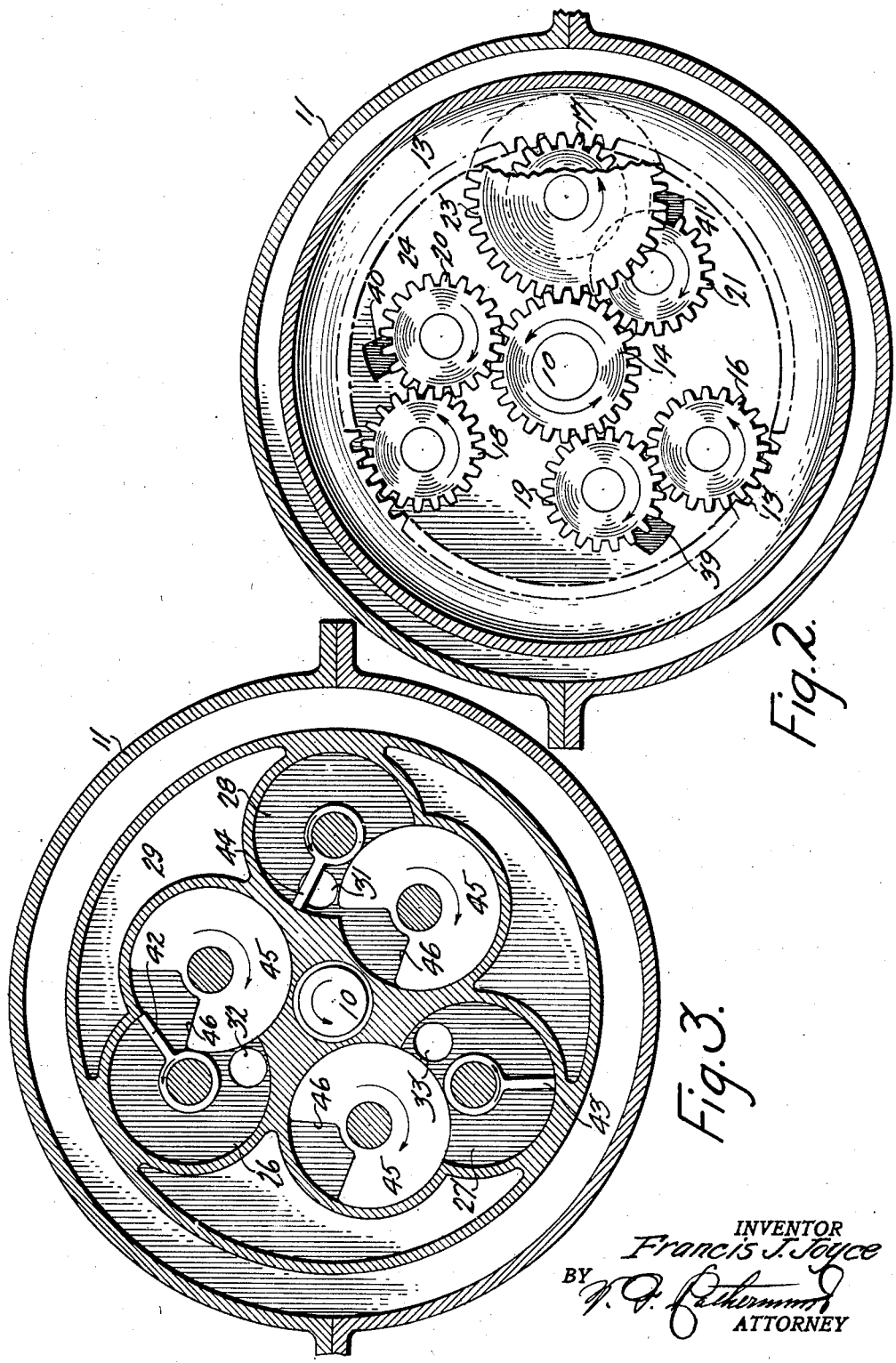

May 11, 1937.　　F. J. JOYCE　　2,079,691
TRANSMISSION
Filed Oct. 26, 1934　　4 Sheets-Sheet 3

INVENTOR
Francis J. Joyce
BY
ATTORNEY

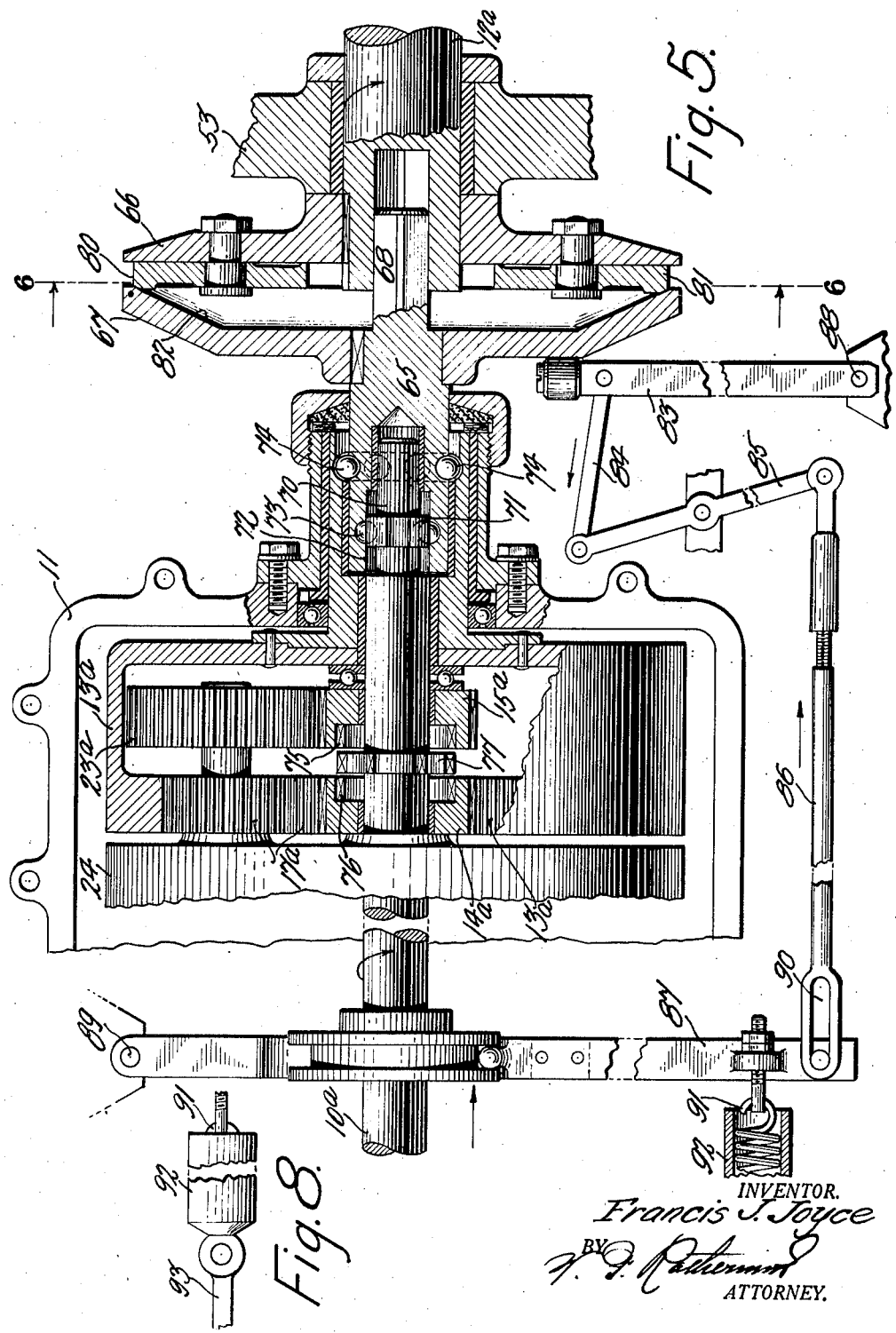

Patented May 11, 1937

2,079,691

UNITED STATES PATENT OFFICE 2,079,691

TRANSMISSION

Francis J. Joyce, Keyport, N. J.

Application October 26, 1934, Serial No. 750,094

20 Claims. (Cl. 74—294)

This invention relates in general to power transmissions and more particularly to such transmissions as are adapted to automatically vary the driving ratio between the driving and the driven member to a point providing the highest driving efficiency.

The invention as herein disclosed is especially suited for application to motor vehicles and comprises a positive drive means hydraulically controlled in an automatic manner by the amount of load encountered which accordingly controls the driving ratio of the mechanism.

A feature of the invention is a planetary driving mechanism that is actuated over an infinite speed ratio by the pressure of a fluid which is imposed upon certain movable elements in a manner to yieldingly restrain the rotation of a number of planet pinions to a greater or lesser degree dependent upon the amount of torque transmitted. This fluid pressure is controlled by a novel means that is responsive to the centrifugal forces which are engendered by the speed of the driven means.

An object of the invention is to provide a simple and compact mechanism for the purpose set forth that is composed of only a few number of elements, thus obviously reducing the cost of manufacture and also the tendency towards non-functioning of the device from failure of the parts.

Various other objects and advantages of the invention will be in part obvious from an inspection of the accompanying drawings and a careful consideration of the particular decription and claims of one form of mechanism embodying my invention as hereinafter set forth.

Figure 6:
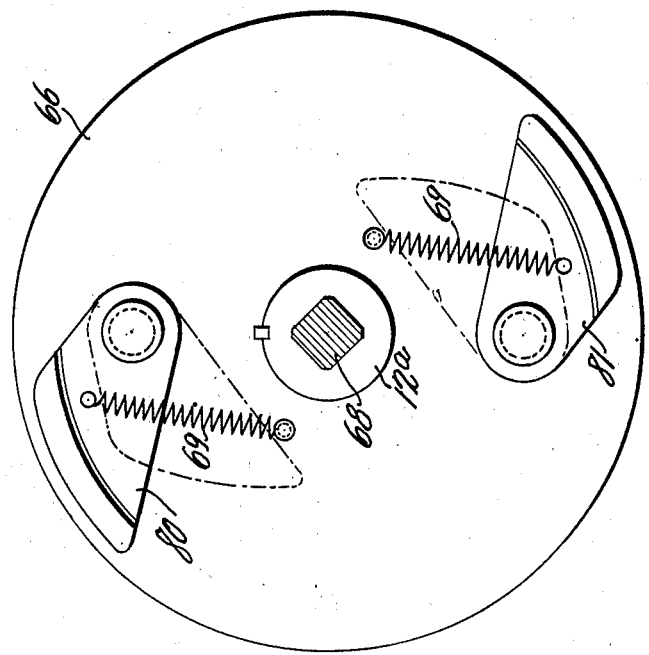
Figure 7:
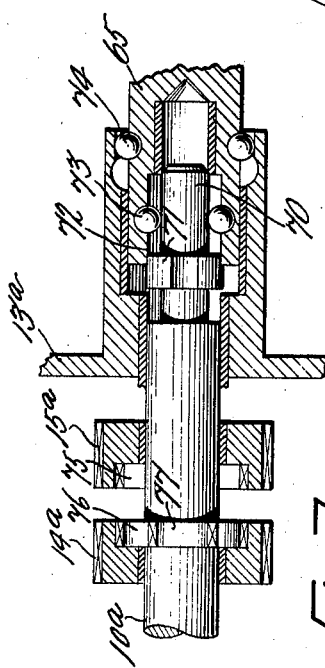
Figure 4:
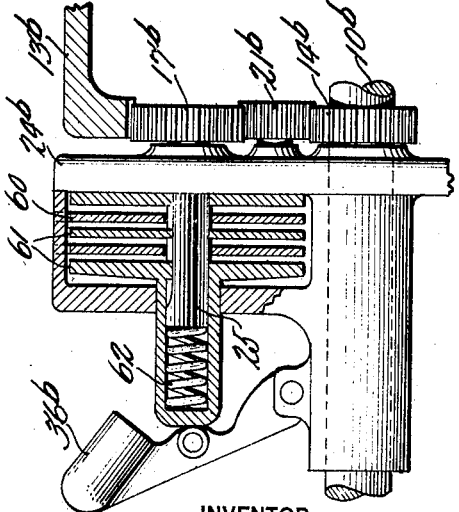

In the drawings:

Figure 1 is a longitudinal section in plan of the present invention with the upper part of the casing removed. Figure 2 is a cross section taken on the line 2—2 of Fig. 1, looking in the direction as indicated by the arrows. Figure 3 is a cross section taken on the line 3—3 of Fig. 1 looking in the direction as indicated by the arrows. Figure 4 is a longitudinal section showing a portion of an alternative construction. Figure 5 is a longitudinal section of a direct drive mechanism. Figure 6 is a cross section taken on the line 6—6 of Fig. 5 looking in the direction as indicated by the arrows. Figure 7 is a fragmentary longitudinal section of some of the parts shown in Fig. 5 indicating another position. Figure 8 is a fragmentary portion of Fig. 5.

With reference to the drawings, 10 designates a drive shaft operable from a prime mover (not shown) said shaft being rotatably mounted in a casing 11. This shaft is drivably connected to a driven shaft 12 by means of an internal gear 13, sun gear 14, planet pinions 16, 17, and 18 in mesh with said internal gear and the intermediate idler pinions 19, 20, and 21. It should be noted that the drive shaft 10 can be moved axially with its associated sun gear 14 by means of a manually operated lever 22 in order to actuate the mechanism either into a one speed reverse torque which is accomplished by bringing the sun gear 14 into mesh with a reverse gear 23, or into a neutral position by moving the sun gear into an intermediate demeshed position.

The pinions 16, 17, 18, 19, 20, and 21 as well as the reverse gear 23 are rotatably mounted on a carrier 24 which is mounted for relative rotation on the drive shaft 10.

The structure so far recited constitutes largely a conventional planetary drive system without the usual circular restraining band and the added feature of the idler pinions 19, 20 and 21 the function of which will be hereinafter more fully described. It will be understood by those familiar with planetary drives that if the shaft 10 is operated with the gears in the position shown in Fig. 1 providing that the same are free to rotate there will be high torque transmitted at low speed to the driven member since the driving action upon the internal gear 13 which is part of the driven member is through the rotational driving effort of the pinions. Now however, if we lock or restrain the pinions against any individual rotation or planetary movement we will operate the driven member directly from the sun gear at drive shaft speed. On the other hand, if we permit a creep or restricted planetary movement of the pinions we will transmit torque to the extent of which their free rotation is impeded.

One of the essential features of this invention is the mechanism that imposes a restraint against the free rotation of the above mentioned pinions which will now be described in greater detail: In conjunction with the pinion carrier 24 which forms one of the end walls, there are provided a plurality of pressure chambers 26, 27, and 28 somewhat resembling the figure eight in contour and having an end or closing wall 29 in which is formed a number of exhaust ports 31, 32, and 33 which are normally closed by suitable valves 34 backed by a light predetermined spring 35. These valves are restrained to oppose the fluid pressure thereagainst to a greater or lesser degree by the amount of centrifugal force generated which becomes effective upon the weights 36, 37, and 38 which bear against these valves and which are responsive solely to the transmitted torque and not the speed of the drive shaft.

In the pinion carrier 24 there are formed a number of intake ports 39, 40, and 41 which will permit the entrance of a fluid (not shown) into the pressure chambers 26, 27, and 28 assuming that the casing 11 is filled with a suitable fluid such as oil. The shafts of the above mentioned pinions are supported in suitable bearings mounted in the carrier and extend in pairs into the pressure chambers respectively. Upon each of the shafts of the pinions 16, 17, and 18 within said chambers there are secured respectively the radially extended compressor blades 42, 43, and 44 which are in leak proof contact with the walls of the pressure chambers and it should be noted that their positions with relation to their respective exhaust ports 31, 32, and 33 are staggered, that is to say the blade 42 is beginning to create fluid pressure, the blade 43 is under pressure and the blade 44 is exhausting or under no material pressure. This staggered arrangement of the blades is for the purpose of producing a substantially constant or unvarying pressure upon the fluid. It will be understood that these blades act as a restraining means for the pinions 16, 17, and 18 and that the amount of such restraint is governed by how freely the fluid is permitted to pass out of the exhaust ports 31, 32, and 33 by the centrifugally actuated exhaust valves. In order that the blades may function successfully in their compressive effort within their respective chambers, there are mounted in each chamber on the shaft ends of the pinions 19, 20, and 21 a circular member 45 having a radially arranged cut out portion 46 which rotates in step with its companion blade so that said blades may have the necessary clearance in their operation about their axes. These circular members constitute barriers which are in leak proof contact with the side and end walls of the pressure chambers and also the hub portion of the blades as shown and it will be understood that these circular members in their operation about their axes always close off a part of the figure 8 chambers so that the fluid will not be just idly washed around by the motion of the blades but confined in such a manner as to be subject to pressure thereby. The action of the meshed gears adjacent the intake ports plus the vacuum or suction created by the rotating blades provides a pumping action which sets the fluid in motion into and out of said chambers. The fluid is under pressure only within the pressure chambers and not in the casing 11.

It will be apparent from the above description that due to the combined action of the fluid, the blades and the centrifugally actuated valves of the exhaust ports, the planet pinions can be effectively restrained in their rotation in a manner as to change the driving ratio between the driving and the driven member. It might be mentioned in passing that if only one of the pinions is restricted from free rotation the tendency towards planetary motion will be interrupted and faster operation of the driven member will result therefrom. The staggered arrangement of the blades to produce an even fluid pressure can be thus appreciated since one of the three pinions shown in this instance is always in full control.

It might also be mentioned that the breaking up or saponification of the fluid employed is a recognized condition in hydraulics due to the structure of the fluid which is usually oil. Provisions have been made in the present instance to render this condition practically ineffective upon the operation of the mechanism. This result has been achieved by the widely spaced relation of the intake and the exhaust ports and the use of only a single compressor blade in each chamber thereby permitting the greatest possible volume of fluid in the chambers, this volume being great enough to again permit reduction by compressive effort to an effective volume before exhausting. With the above mentioned provisions it has been found that there is sufficient volume of fluid contained in the presure chambers to be effective even though it may be saponified.

With reference to Figure 1 there is shown a conventional overrunning clutch 50 which permits forward rotation of the pinion carrier exclusively. This is for the purpose of preventing any backward creep of the pinion carrier when the planetary drive is in effect. To prevent a similar action on the part of the carrier when the mechanism is in "reverse" there has been provided a locking device 51 which is moved into engagement with any one of a number of lugs 52 on the carrier by means of a shift lever 22.

With further reference to Fig. 1 there is shown a rotatable wall 48 mounted in the casing 11 which can be employed in some instances where it might be desirable to lubricate the gears with a fluid other than that used hydraulically. Also it might be mentioned that to all appearances the sun gear 14 in this figure is in mesh with both the reverse gear 23 and the planet pinions 19, 20, and 21. This is however not actually so since the sun and the reverse gears are not in the same plane.

The operation of the device is as follows:

Assuming the parts to be in the position of Fig. 1 the drive shaft 10 is operated at the speed of the prime mover. This drive will be transmitted to the driven member 12 which we will assume is under load, by the planetary driving action of the planet pinions 16—21 which are mounted in the carrier 24 said driving action being effective on said carrier due to the creep of the pinions around the sun gear 14 it being understood that the overrunning clutch 50 as hereinbefore described does not retard the forward motion of said carrier but only prevents the backward creep thereof. The drive thus produced will be of a low speed high torque driving character. At this initial speed of the mechanism the free flowing of the fluid through the pressure chambers will be slightly restrained to the extent of the spring pressure upon the exhaust valves it being understood that the centrifugal weights are not at that time effective due to the low speed rotation of the driven parts. However as the load carried by the driven member is set into motion the driving effort required will accordingly become less and less and there will be a gradual pick up in speed which can also be increased by the acceleration of the prime mover. This increase in speed will become more and more effective upon the centrifugal weights thus more tightly sealing the exhaust ports with the result that the passage of the fluid through the chambers is progressively impeded. Since the compressor blades are making a futile effort to displace the fluid from the chambers the rotation of these blades and the associated pinions will be restricted to a greater or a lesser degree dependent upon the volume of fluid displaced, thus the tendency is created towards a smoothly accelerated high speed 1 to 1 ratio. Should an overload be encountered it is only natural that the speed of the driven member and its associated parts is accordingly reduced and since this speed controls the action of the weights, the fluid will again be more readily displaced with an accompanying release of the pinions which will then begin to once more planetize thus reducing the gear ratio in conformity with the load being carried.

When a reverse drive is desired the shift lever 22 is moved forwardly, the sun gear is thereby moved into mesh with the reverse gear and the carrier is locked against opposite rotation by the locking device. Since there is no pressure produced upon the fluid in reverse there is accordingly only one speed at a low gear ratio in a reverse direction.

With reference to Fig. 4 there is shown an alternative structure using the same principle of bringing about a variation in the driving ratio by restraint of the planet pinions with the difference however that in this instance hydraulic means have been displaced by frictionally engaged elements acting in the same capacity.

The drive shaft is designated by 10b on which is drivably mounted a sun gear 14b, and a carrier 24b which is rotatably mounted thereon. This carrier rotatably supports a plurality of planet pinions 17b which mesh with an internal gear 13b connected to the driven member (not shown). The sun gear 14b is drivably connected to said planets by means of intermediate idler gears 21b.

On one or more of the shafts 25 of the planet pinions 17b there is mounted a disk clutch 60 having friction plates 61 which are normally in a released position as shown due to a light spring 62. A centrifugal element 36b responsive to the speed of the carrier 24b counteracts the spring pressure and brings the clutch plates together to an extent governed by the pressure of the centrifugal element. It will be readily understood that the planets are thus variably restrained from rotation in a manner as effective as the hydraulically operated method just described.

With reference to Fig. 5 there is shown a further alternative construction of the invention in which there is featured a direct drive between the driving and the driven members when a certain predetermined high speed of the driven member is attained. This direct drive is brought about by bringing these members into engagement by automatic means that will also disconnect them from the usual gear drive thus avoiding all intermediate connections.

It might be mentioned that the planetary drive with its accompanying method of pinion restraint as hereinbefore described has been maintained in this particular instance and that the improved features comprise only a means to permit the gear drive to be automatically disconnected when direct drive is accomplished.

Bearing in mind that Fig. 5 illustrates the device in its actuated high speed position, the usual drive member is designated by 10a and the driven member comprises the two axially separable major elements 12a and 65 which are mounted for unitary rotation in a cross member 53. A high speed actuated clutch comprises the two members 66 and 67 one of which is keyed to the driven member 12a and the other to the shaft 65, the member 66 being provided with two or more centrifugal weights 80 and 81 adapted to be moved outwardly against the resistance of a predetermined spring means 69 at a certain speed. This will cause an axial separation of the clutch members 66 and 67 due to pressure of these weights against the angular surface 82. The separation of these elements has its effect upon both the driven member 65 and the drive member 10a in that it brings these two members directly into driving engagement with an accompanying release of the gear drive as will be more fully described hereinafter. The end of the shaft 65 is formed into a substantially square section 68 (Fig. 6) which fits into a similarly constructed receiving portion of the driven member 12a so as to maintain a constant driving relation whilst being axially separated.

Attention is now directed to the drive member 10a the diameter of which has been generally reduced at 70 (Figs. 5 and 7) so as to telescope with the driven member 65 with the exception of a diametrically enlarged portion 71 which is in close fitting contact with a similarly enlarged bore 72. Adjacent this enlarged portion of the drive member there have been formed within the bore 72, a number of semi-spherical pockets into which are fitted the balls 73, and the portion 71 has accordingly been milled in an axial direction to accommodate these balls for engagement therewith when the drive member and the driven member are axially shifted towards each other in a direct drive action. The member 65 has also been provided on its outer circumference with a plurality of semi-spherical pockets into which are fitted the balls 74 which drivably engage or release the driven member with the internal gear 13a by the axial movement of the member 65. The positions of the various elements shown in Fig. 5 being as indicating a direct forward drive at 1 to 1 ratio, it will be readily understood that when one series of balls is in driving engagement the other series is always in a non-engaged position and at no time can both become engaged.

In this particular instance the drive member 10a has been equipped with two sun gears or rather one sun gear divided into two parts 14a and 15a both of which are loose on said member in axially spaced relation and recessed on their opposing sides in a manner as to provide internal engaging means 75 and 76 adapted to be drivably engaged by a male driving member 77 secured to the drive member and disposed intermediate said gears.

In this instance the gear 15a is in constant mesh with the reverse gear 23a while the other one is in constant mesh with the internal gear 13a through the intermediate planet pinions 17a. When a direct drive has been accomplished the driving element 77 is always in an intermediate neutral position as shown in Fig. 5.

As said before, the axial movement of the clutch member 67 away from its companion member 66 is brought about by the outward action of the centrifugal weights 80 and 81 at high speed. This axial movement also becomes effective upon the drive member through a series of levers and linkages 83, 84, 85, 86, and 87 the lever 83 being pivoted at 88 and the lever 87 at 89. The link 86 has an elongated opening 90 which will be hereinafter referred to. A spring 91 is secured in a cylindrical casing 92 which is connected to a manually operated shift lever not shown.

With reference to Figs. 5, 6, 7, and 8 the operation of this preferred showing is as follows:

Assuming the position of the elements to be as in Fig. 7 which indicates that the mechanism is in forward drive at less than high speed, the torque being transmitted through the internal gear 13a to the driven member in the usual manner as hereinbefore set forth, the driven member becomes accelerated to a predetermined speed which is effective upon the weights 80 and 81 thus forcing the clutch members 66 and 67 apart and axially moving the member 65 to the position of Fig. 5 by which the internal gear 13a is released due to the non-effective position of the balls 74. This axial movement of the member 65 also becomes effective upon the lever 83 which transmits motion in a direction indicated by the arrows through the linkages 84, 85, 86 to the lever 87 which causes the drive member 10a to be shifted into a neutral position as shown in Fig. 5. This combined cooperative axial movement of the drive and the driven members also causes the balls 73 to drivably engage the driven member 65 thus creating a direct drive without the use of any of the intermediate gears or pinions which are now entirely at rest.

When a reduction of speed takes place as due to an overload, the weights 80 and 81 will be retracted by the springs 69 and a combined return movement of the clutch member with its accompanying driven member 65 and the drive member 10a will be brought about by the tension of the spring 91 through the above mentioned linkages. This action will bring the drive member into mesh again with the sun gear and cause a release from its direct engagement with the driven member by means of the balls 73, said movement also reestablishing this member's connection with the internal gear 13a by means of the balls 74 as shown in Fig. 7, thus the mechanism is returned to its initial low speed operation.

If a reverse drive is desired at which there is only one speed, the manual shift is put into effect through a linkage 93 (Fig. 8) which moves the spring casing 92 (Fig. 5) against a lever 87 which will bring about an axial shift of the drive member into engagement with the reverse gear 23a. This movement will not be effective upon the linkages due to the provision of the elongated opening 90 of the link 86.

Having thus described my invention, I claim:

1. In apparatus of the class described, the combination with a driving and a driven member, of an axially shiftable sun gear between the driving and driven members, a plurality of fluid pressure chambers, a plurality of planet pinions co-axial with said chambers and having rotationally effective pressure elements extending into said chambers, said pinions constituting an intermediate variable ratio drive between said driving and driven members, centrifugal means, and valve means governed by the centrifugal means to control the displacement of a fluid from said chambers by said pressure elements.

2. In apparatus of the class described, in combination, a drive member, a driven member, a planetary drive therebetween comprising an axially shiftable sun gear, pinions adapted to vary the driving ratio by being rotationally restrained to a greater or lesser degree and engageable by said sun gear, a pinion restraining means comprising fluid pressure chambers co-axial with said pinions, rotatable pressure elements connected to shafts on said pinions for operation in said chambers tending to displace the fluid, and centrifugal means to control the egress of the fluid.

3. In a transmission, the combination with a driving and a driven member connected by a gear train having planetizing pinions, of an axially shiftable sun gear on the driving member adapted to engage said pinions, a means adapted to variably restrain the planetization of said pinions so as to change the driving ratio of said train said means comprising circular pressure chambers having radially disposed pressure elements therein connected to shafts on said pinions, and centrifugal control means to govern the movement of the fluid into and out of said chambers.

4. In a planetary transmission, the combination of a drive member, a driven member, a shiftable sun gear, a variable ratio driving connection therebetween comprising planet pinions engageable by said sun gear and adapted to vary the driving ratio by being restrained from free rotation, means to variably restrain said pinions comprising an impedance, elements extending radially from the pinion axes and adapted to rotationally act against said impedance, and control means to vary the magnitude of said impedance.

5. The combination with a driving mechanism having an axially sun gear and a plurality of variable ratio driving elements normally in low speed position between the driving and driven members thereof and engageable by the sun gear, of a rotational restraining means for certain of said driving elements tending to vary the driving ratio between said members said means including radially disposed blades acting against a fluid in a manner as to displace the same, and automatic ratio changing means effective upon said fluid.

6. In automatic apparatus of the class described, in combination, a drive member including a shiftable sun gear, a driven member including an internal gear, a pinion carrier having fluid pressure chambers, pinions rotatably mounted in said carrier and drivably connected to the sun and internal gears said pinions having their shafts extending into said chambers, radially disposed pressure elements on some of said pinion shafts adapted to rotate within said chambers, the chambers having valve controlled ports for the passage of a fluid, and centrifugally operated valve actuating means.

7. In a variable speed transmission, the combination of a shiftable driving sun gear, a driven internal gear, a pinion carrier co-axial with the sun gear, pinions having integral shafts mounted in said carrier and drivably connected with said sun and internal gears, ratio changing means to variably restrain the rotation of said pinion shafts and their associated pinions said means comprising blades acting against a fluid, and a speed responsive means to control the movement of the fluid.

8. In a variable ratio transmission, the combination of an axially shiftable drive member, a driven member, a gear train comprising an internal gear in driving relation with the driven member, a reverse gear engageable by the driving member when said driving member is axially shifted, a pinion carrier mounted on the drive member for relative rotation, planet pinions having shafts mounted in said carrier and adapted for driving relation with said sun gear and said internal gear, means radially extending from said shafts and adapted by cooperation with a fluid to restrain the planetization of the pinions to a greater or lesser degree, and centrifugal means to control the action of said fluid.

9. In a two-directional power transmission comprising a planetary driving mechanism having a sun gear shiftable to drive in either direction, of a means adapted to vary the driving ratio by offering rotational restraint to some of the driving elements said means including fluid pressure chambers, and pressure elements in said chambers acting rotationally against a mobile fluid in a manner as to restrain the said driving elements, and valve means operatively controlling the movement of the fluid.

10. In a variable ratio transmission, the combination of a driving member, a driven member, a planetary gear drive therebetween comprising an internal gear, planet pinions in driving relation with said internal gear, a reverse gear; said driving member being axially shiftable for the operation of either the pinions or said reverse gear, a fluid pressure chamber for at least one of said pinions, a pressure element having a fixed relation with said pinion and operatively disposed within said chamber to displace a fluid therefrom, intake and exhaust ports for said chamber, a valve means to control the egress of the fluid from said chamber, and centrifugal means to operate the valve means.

11. In a variable ratio transmission, the combination of a driving member, a driven member, a planetary gear drive therebetween comprising an internal gear, planet pinions in driving relation with said internal gear, a reverse gear; said driving member being axially shiftable for the operation of either the pinions or said reverse gear, hydraulic chambers, compressor means in uni-rotational relation with said planet pinions adapted to displace a fluid from said chambers by rotation therein, valve means to control the egress of the fluid, the rotation of said pinions being controlled by the rate of fluid displacement, and valve control means to actuate the same in substantial conformity with the load transmitted.

12. In a variable ratio transmission, in combination, a drive means, a driven means, a planetary gear drive therebetween comprising an internal gear, a sun gear, a reverse gear and ratio changing planet pinions; the sun gear being shiftable from a neutral position to engagement with either the reverse gear or the planet pinions, a carrier in which the planet pinions are rotatably mounted by means of shafts, fluid compression chambers into which said shafts extend, fluid compressor elements mounted for rotation with said shafts to displace a fluid from said chambers, a valve means to control the egress of the fluid, and centrifugal means adapted to control the valve action.

13. In a variable ratio transmission, in combination, a drive member, a driven member, a planetary gear drive therebetween comprising an internal gear, a reverse gear, ratio changing planet pinions, the drive member being operatively engageable with either the pinions or said reverse gear, intermediate idler pinions, a carrier in which all of said pinions are mounted for rotation by means of shafts, fluid compression chambers into which the shafts extend, fluid compressor elements mounted for rotation with the shafts of the first said pinions to displace the fluid from the chambers, rotatable barrier means mounted on the shafts of the idler pinions, intake and exhaust ports in said chambers, valve means to control the egress of the fluid from said chambers, and centrifugal means to control the valve action.

14. In apparatus of the class described, the combination of a driving member, a driven member, a planetary gear drive therebetween comprising ratio changing planet pinions having shafts; said pinions being rotationally controlled by the rate of displacement of a fluid which is effective upon the driving ratio, a reverse gear on one of said shafts adapted to be drivably engaged by the driving member when axially shifted, fluid chambers, compressor means in uni-rotational relation with said pinions to displace the fluid from said chambers by rotation therein, valve means to control the egress of the fluid from said chambers, and centrifugal means to control the valve action.

15. In apparatus of the class described, the combination of a driving member, a driven member, a planetary gear drive therebetween comprising an internal gear, planet pinions in mesh with said internal gear and adapted for operation by said driving member, a reverse gear in fixed relation with one of said pinions and adapted for optional operation by said driving member, ratio change means comprising elements in uni-rotational relation with said pinions and adapted to displace a fluid by rotational pressure thereagainst, and speed responsive means adapted to control the rate of displacement of said fluid.

16. In a variable ratio planetary transmission, in combination, a drive shaft, a driven shaft, a reverse gear, said drive shaft being axially shiftable to engage said reverse gear, an internal gear for said driven shaft, planet pinions in mesh with both the sun gear and the internal gear and adapted to be rotationally restrained by a fluid so as to change the driving ratio, and centrifugally actuated means to govern the flow of the fluid.

17. In a variable ratio planetary transmission, in combination, a drive shaft, a driven shaft, planet pinions, a sun gear, an internal gear, automatic means operative at a certain predetermined speed of the driven shaft to effect a direct driving connection between the drive and the driven shafts; said means comprising axially shiftable self acting locking elements between the shafts.

18. In a variable ratio transmission, the combination of a drive shaft, a driven shaft, an internal gear, a sun gear, planet pinions between said sun gear and said internal gear, means to variably control the rotation of said planet pinions to effect a change in the driving ratio, a releasable driving connection between said internal gear and said driven shaft, a releasable direct driving connection between the drive and the driven shafts, a driving connection control means responsive to the speed of the driven shaft; both of said driving connections being alternately operable by said control means.

19. In a transmission, the combination with a driving and a driven member, of a planetary driving connection therebetween including fluid pressure chambers having rotatable blades radially disposed in said chambers tending to displace the fluid therefrom, centrifugally actuated valve means to control the egress of said fluid, and further centrifugally actuated means to bring the drive and the driven shafts into direct driving connection at a predetermined speed of the driven shaft.

20. In a variable ratio transmission, the combination with a planetary drive having a driving and a driven member, of a direct driving connection between said driving and driven members responsive to a predetermined speed of the driven member; said connection comprising self acting releasable engaging means adapted to alternately effect an exclusive engagement of the driven member with either the planetary drive or the driving member dependent upon said predetermined speed.

FRANCIS J. JOYCE.